United States Patent [19]

Kronhamn

[11] Patent Number: 5,739,789
[45] Date of Patent: Apr. 14, 1998

[54] METHOD FOR POSITION DETERMINATION

[75] Inventor: Thomas Rolf Kronhamn, Hälsö, Sweden

[73] Assignee: Telefonaktiebolaget LM Ericsson, Stockholm, Sweden

[21] Appl. No.: 646,886

[22] Filed: May 8, 1996

[30] Foreign Application Priority Data

May 8, 1995 [SE] Sweden .................. 9501694

[51] Int. Cl.$^6$ .................. G01S 3/02; G01S 5/04
[52] U.S. Cl. .................. 342/465; 342/451; 342/417; 342/449
[58] Field of Search .................. 342/417, 465, 342/449, 451, 429

[56] References Cited

U.S. PATENT DOCUMENTS

| | | |
|---|---|---|
| 3,445,847 | 5/1969 | Hammack . |
| 4,060,809 | 11/1977 | Baghdady .................. 342/451 |
| 4,350,984 | 9/1982 | Fisher .................. 342/451 |
| 4,499,468 | 2/1985 | Montana .................. 342/463 |
| 4,621,267 | 11/1986 | Wiley .................. 342/462 |
| 4,806,936 | 2/1989 | Williams et al. .................. 342/126 |
| 4,914,604 | 4/1990 | Castelaz .................. 364/517 |
| 5,045,860 | 9/1991 | Hodson .................. 342/451 |
| 5,128,684 | 7/1992 | Brown .................. 342/189 |
| 5,307,289 | 4/1994 | Harris .................. 364/516 |
| 5,389,936 | 2/1995 | Alcock .................. 342/465 |
| 5,400,264 | 3/1995 | Phillis et al. .................. 364/516 |
| 5,504,489 | 4/1996 | Kronhamn .................. 342/118 |
| 5,512,909 | 4/1996 | Kronhamn .................. 342/417 |

FOREIGN PATENT DOCUMENTS 26 20 687  5/1991  Germany .

Primary Examiner—Gregory C. Issing
Attorney, Agent, or Firm—Burns, Doane, Swecker & Mathis, L.L.P.

[57] ABSTRACT

Method which involves determining the position of a number of measured objects by determining a number of directions to the measured objects from at least two measuring stations, of which at least one is mobile, the method being used to decide which of the points of intersection between the directions correspond to measured objects and which ones do not correspond to measured objects. Changes in the mutual movements between the measuring stations and the points of intersection are in this case determined by comparison between the paths in which the points of intersection and the measuring stations are moving. The points of intersection whose movement is not affected by changes in the movement of other points of intersection, or by changes in the movement of at least one measuring station, correspond to positions of measured objects.

7 Claims, 10 Drawing Sheets

METHOD FOR POSITION DETERMINATION

BACKGROUND

The present invention relates to a method for deciding, when determining position by means of directional measurements, which positions correspond to measured objects and which positions do not correspond to measured objects.

For determining the position of a measured object by passive methods, various types of sensors are used which detect signals which the measured object transmits. For measured objects in water, acoustic sensors are often used which detect sound from the measured object, whereas in the air the heat radiation from the measured object can be detected by infrared-sensitive detectors. In those cases where the measured object actively transmits electromagnetic radiation with the aid of radio or radar transmitters, this radiation can be detected by detectors adapted to the appropriate frequency range.

A common feature of these passive methods is that they can only be used for determining the direction to the measured object, and no determination of distance is possible. Therefore, in order to determine the position of the measured object, several direction determinations have to be made from at least two different measuring points. This procedure, in most cases called cross-bearing or triangulation, gives a satisfactory result when measuring in respect of a single measured object, but problems arise when the positions of several measured objects have to be determined simultaneously. The problem is due to the fact that the number of points of intersection between the measured directions, normally called "crosses", increases quadratically (in the case of two measuring sites) with the number of measured objects, and a decision must be made as to which crosses relate to the measured objects and which crosses do not correspond to measured objects. The last-mentioned crosses are often called "false" crosses and can be said to correspond to "false" measured objects. The process of determining which crosses originate from measured objects and which crosses are false is called "deghosting" in English, and this term will be used hereinafter.

One way of carrying out deghosting is to correlate the directional measurements from three or more measuring stations. The directions from three (or more) measuring stations will only form crosses for genuine measured objects and it is therefore easy to screen out the false crosses.

However, the problem is often complicated by the fact that, from the measuring sites, it is not always the same number of measured objects that is detected, and the measured objects are detected in different sequences and at different points in time, which naturally affects the measurement result in the case of measured objects which are moving.

The methods for "deghosting" therefore need to be supplemented, and various methods have been tested. The process is often carried out in several stages, of which a first stage involves the elimination of unreasonable direction combinations, such as non-intersecting directions, or of crosses which are not possible in the case of time correlation, for example, or on account of other disparities in the detected signal.

In the case of mobile measured objects, a second stage can involve tracking the remaining crosses for a period of time, during which the changes in the positions of the crosses are assessed in relation to the expected behaviour. For example, speed and changes in speed can be used to eliminate further false crosses.

It is also possible to assess the "quality" of the crosses, that is to say how well the directions intersect one another at a point. This is effective with two measuring sensors which measure both side angle and angle of elevation, and if the sensors and measured objects are not situated in the same plane.

Another method of "deghosting" is described in the American Patent U.S. Pat. No. 4,621,267. According to the latter, special antenna systems measure signals which have travelled along different paths between the measured object and the sensor. In this way, both the distance to the measured object and its vertical height can be determined, and this of course considerably improves the possibility of "deghosting".

Another way of carrying out deghosting is discussed in U.S. Pat. No. 4,806,936. At least three (stationary) sensors are used in this case. By, among other things, assessing the size of the triangles which are formed during measurement from three measuring sites, certain false measured object positions are eliminated, while the final elimination of false measured objects is carried out with the aid of statistical probability calculations. The disadvantage of this method is that it requires at least three measuring stations and that precise time synchronization of the measurements seems to be necessary in order to obtain good coincidence between the measured directions.

U.S. Pat. No. 5,504,489 describes a method passive distance measurement which does not require time synchronization. According to this method, measuring stations are moved away from one another from a common starting position. In the starting position, a number of hypotheses are created for the position of the measured object along the measured direction. The position changes of the hypotheses during the subsequent measurements are tracked, and the hypothesis whose position changes best correspond to the expected behaviour of the measured object is determined. The method is principally intended for determining the distance to a measured object and it differs from the previously mentioned triangulation methods in that there is no "cross" to work from.

SUMMARY

One aim of the invention is to provide a method for determining, in connection with passive position determination, which positions correspond to measured objects and which positions do not correspond to measured objects.

Another aim of the invention is to make it possible, during position determination with the aid of measurements of the directions to measured objects, to determine which positions correspond to measured objects and which positions do not correspond to measured objects without the need for the measurements to be synchronized in time.

A further aim of the invention is to permit the abovementioned position determination with only two measuring stations.

The abovementioned aims are achieved by means of a method which, according to the invention, utilizes changes in the mutual movements between the measured objects and the measuring stations which are carrying out the direction measurements in respect of the measured objects. When a measured object changes its movement relative to the measuring stations, this change will effect the false points of intersection which are located along the directions which are affected by the change of movement of the measured object. By determining which of the changes of movement of points of intersection correlate, it is therefore possible to determine that point of intersection which corresponds to the measured object which has changed its relative movement.

Furthermore, according to the invention, at least one of the measuring stations can be allowed to change its relative movement. By this means, those points of intersection which do not correspond to measured objects will exhibit changes in movement which are related to those of the measuring station, whereas points of intersection which do correspond to genuine measured objects remain unaffected. This condition is used in order to determine which points of intersection correspond to genuine measured objects.

DETAILED DESCRIPTION

Figure 1:
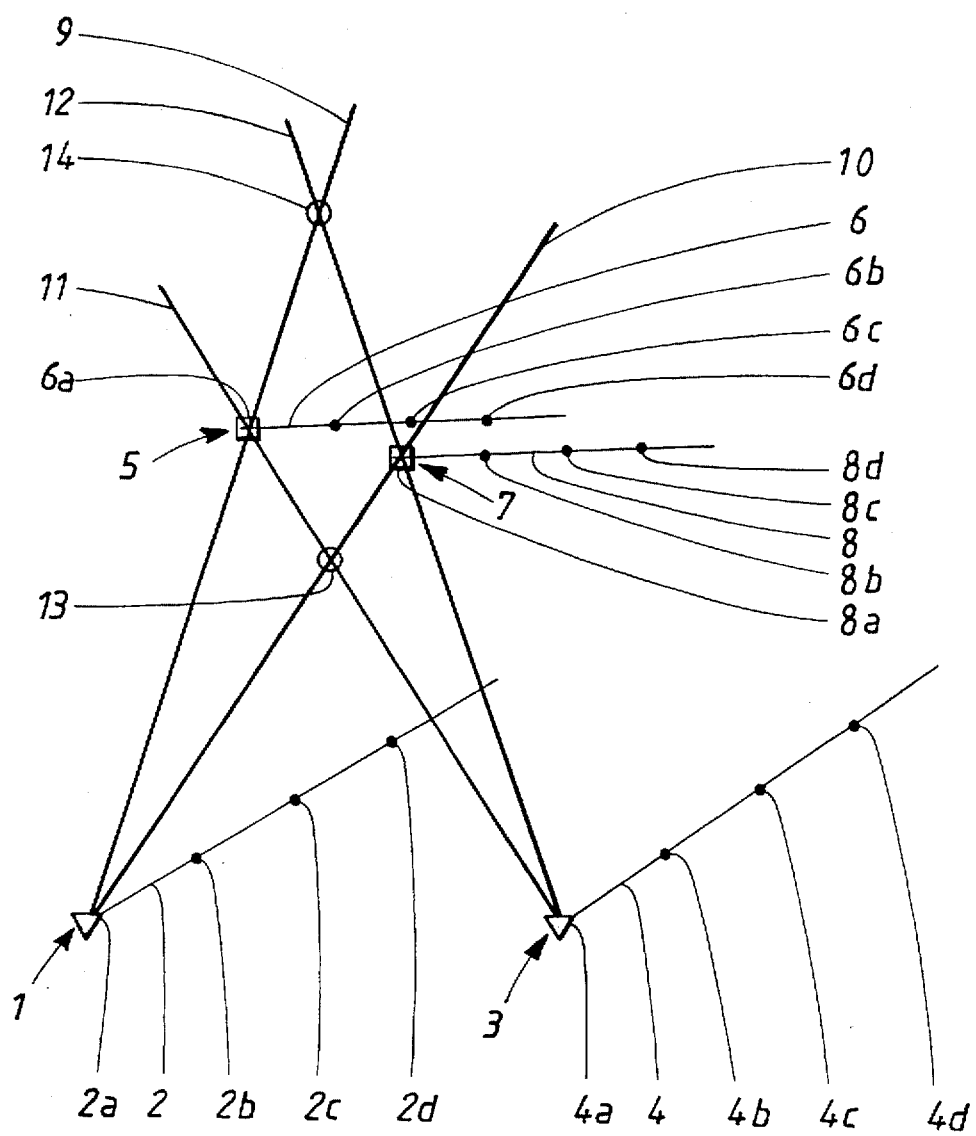
FIG. 1 shows the starting position for a series of measurements of directions to a number of measured objects.

The method according to the invention is based on the principle of distinguishing the genuine and the false measured objects from one another by means of determining and comparing changes in the mutual movements between the measuring stations, which are carrying out the direction measurements in respect of the measured objects, and the measured objects themselves. This can be done by tracking the movements of the genuine and the false measured objects when a genuine measured object changes its relative movement with respect to the measuring stations, or by one of the measuring stations changing its relative movement with respect to the measured objects. By using, in accordance with the invention, at least one mobile measuring station which changes its path, or manoeuvres, a predictable movement (manoeuvre) of the false measured objects is enforced in the latter case. By choosing a suitable path for the measuring station/measuring stations, it is thus possible to create relatively distinct manoeuvres of the false measured objects, and by correlating these to the measuring stations' own movements it is possible to distinguish, with good reliability, between false and genuine measured objects.

In one application example, the measuring stations can be two aeroplanes which are cooperating with each other and which are observing, with "listening" radar, a number of objects in the form of stationary or airborne radar stations in transmission mode. The aeroplanes' own manoeuvres can in this case be performed either by one of them or by both.

The manoeuvres of the observed objects are detected by a "manoeuvre detector", coupled to tracking filters, that is to say devices with which the objects are tracked by means of determining their position, speed, and in some cases also acceleration. A manoeuvre detector is a normal means of improving the tracking performance, for example both when tracking objects with the aid of an active (transmitting) radar, and when determining position by means of the previously mentioned passive methods. Manoeuvre detectors can be designed in different ways. They normally use the tracking filter residual. This uses previous measured values in order to predict the positions of the objects at the next measurement occasion. The positions which are measured at this measurement occasion are compared with the predicted ones, and the difference is returned to the prediction calculations which are successively improved in this way. It is also possible to use other tracking filter information, such as, for example, speed values.

Determination of the position/site of the crosses (false and genuine) which are formed by the points of intersection of the measured directions can be carried out in different ways. However, since these methods do not form part of the invention, they are not described in any detail hereinafter.

In order to ensure that the manoeuvres of the genuine measured objects do not affect the function which is described here, the output signals from the manoeuvre detectors must be assessed with reference to the anticipated result on the assumption that the cross was false. This is done so that the manoeuvre detector's result is assessed both in terms of its size and direction as well as in terms of its time in relation to the manoeuvres of the measuring aeroplanes and to the other detected manoeuvres. For a given direction, as seen from the manoeuvring aeroplane, one of the crosses (the genuine one) must of course not be affected by the manoeuvres of the measuring station, whereas any false crosses between the genuine cross and the measuring station will execute a manoeuvre in the same direction as the measuring station, while any false crosses beyond the genuine cross will execute a manoeuvre in the opposite direction. This wall become clear from the example which follows.

The sizes of the manoeuvres will in this case be dependent on the distance from each false object to the real measured object and on the distance between the measuring aeroplane and the real measured object. The fact that measuring station manoeuvres result in corresponding manoeuvres of all false crosses, while genuine crosses are not affected, is thus of importance.

In order to increase the sensitivity of the manoeuvre detection, a relative assessment is therefore made between the different crosses for each measurement direction. In the following the expression "manoeuvre detection" is used instead of manoeuvre detector in order to emphasize that it does not mean detection in the sense that a certain value has been exceeded ("threshold overshoot").

Finally, a balanced assessment is made of the probability of manoeuvre in the selection of crosses (the global assumption) which are deemed to be possible genuine crosses. A global assumption is a number of the crosses which together represent a non-contradictory explanation for the measurement directions obtained. The global assumption chosen is the one which overall has the least agreement with the measuring station manoeuvre. It is of course in fact that all the false crosses execute manoeuvres while the real ones do not.

It should be noted in this connection that the method according to the invention does not require that the crosses be formed by means of time-synchronous measurements. Time-synchronous measurements can of course be used, but in contrast to other methods the application of the invention is not limited to these measurements. When measurements are used which are not time-synchronous, the positions of the crosses will be more uncertain and can be represented in the form of a "cross area" whose size is essentially determined by the time between the direction measurements and the assumed movement characteristics of the measured objects. Thus, when the invention is put into application, the changes in position of these areas are used.

In the following example, in which one application of the invention will be described in greater detail, the expression cross refers both to time-synchronous crosses and to "cross areas".

The starting position for the example is shown in FIG. 1. Two measuring stations, a first one 1 and a second one 3, which can be assumed to be aeroplanes in this example, are moving along the paths 2 and 4, respectively. In the starting position they are situated at the positions 2a and 4a, respectively. Two measured objects 5 and 7 move along the paths 6 and 8, respectively, and in the starting position they are situated at the positions 6a and 8a, respectively. The directions 9 and 10 to the measured objects 5 and 6, respectively, are determined from the first measuring station 1, and the directions 11 and 12 are determined in a corresponding manner from the second measuring station 3.

In addition to the crosses which are formed at the positions 6a and 8a, the crosses 13 and 14 are also formed, as can be seen from FIG. 1. Simply by carrying out direction measurements from the measuring stations in the starting position, it is not possible to decide which of the crosses originate from genuine measured objects and which crosses are false.

Figure 2:
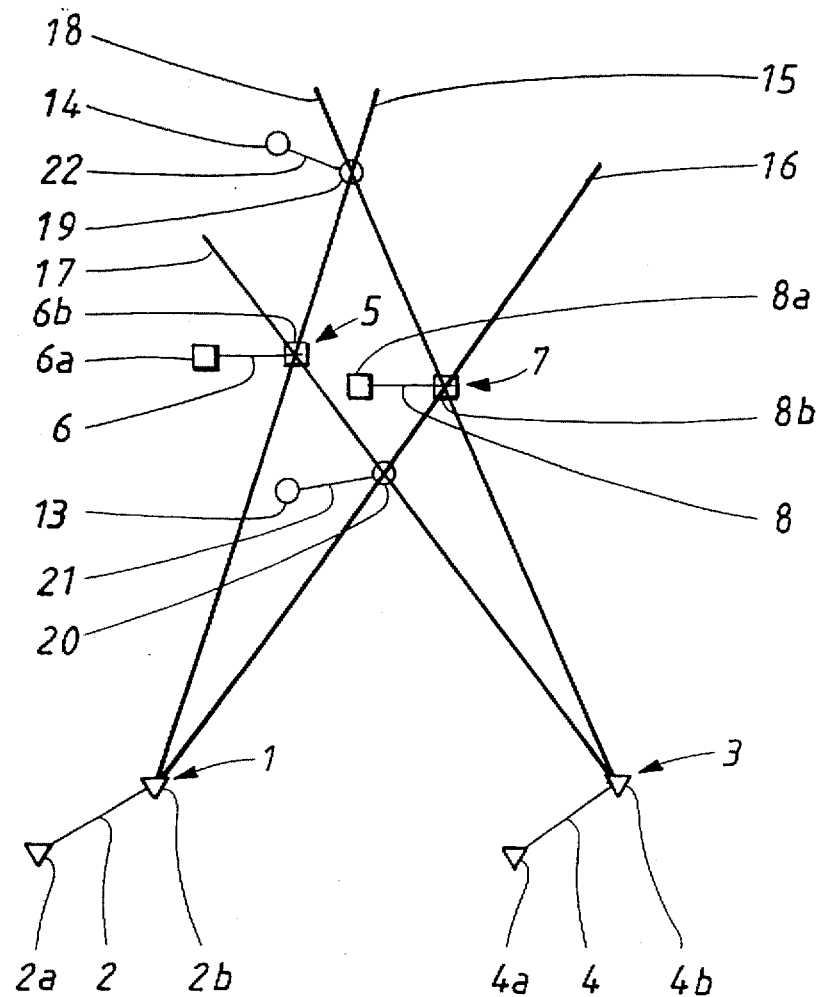
FIGS. 2-4 show subsequent measurement situations.
Figure 3:
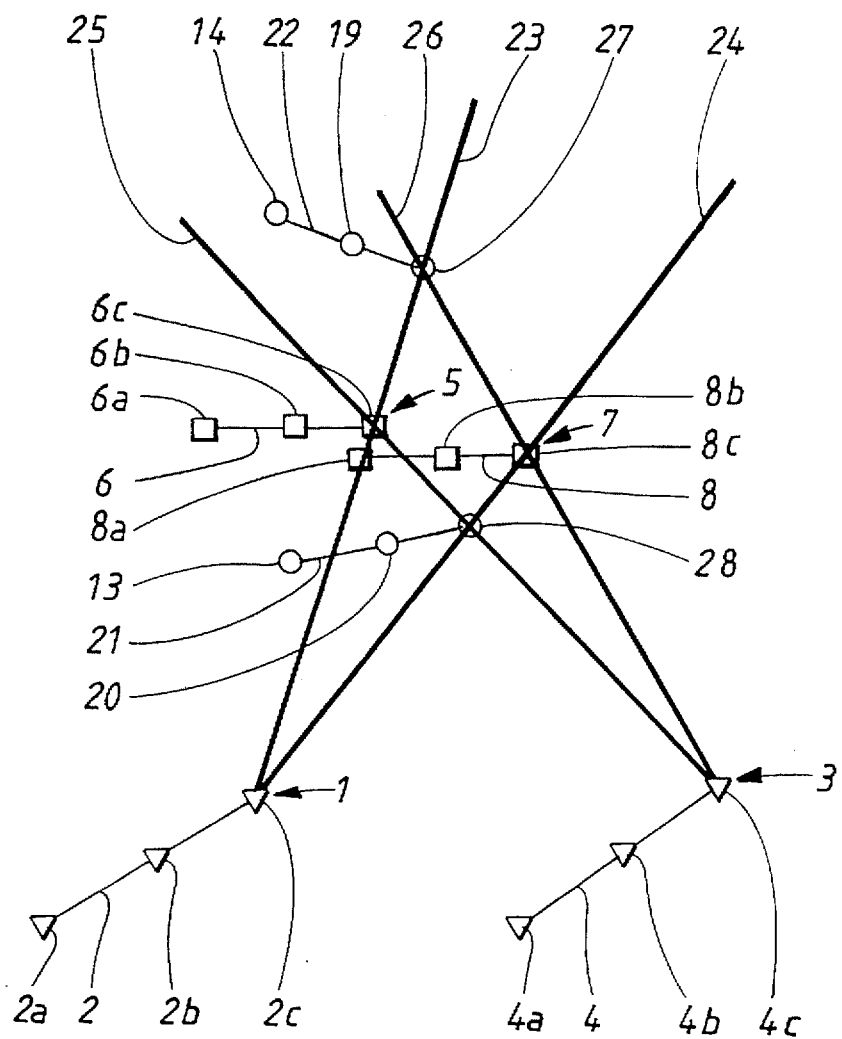
Figure 4:
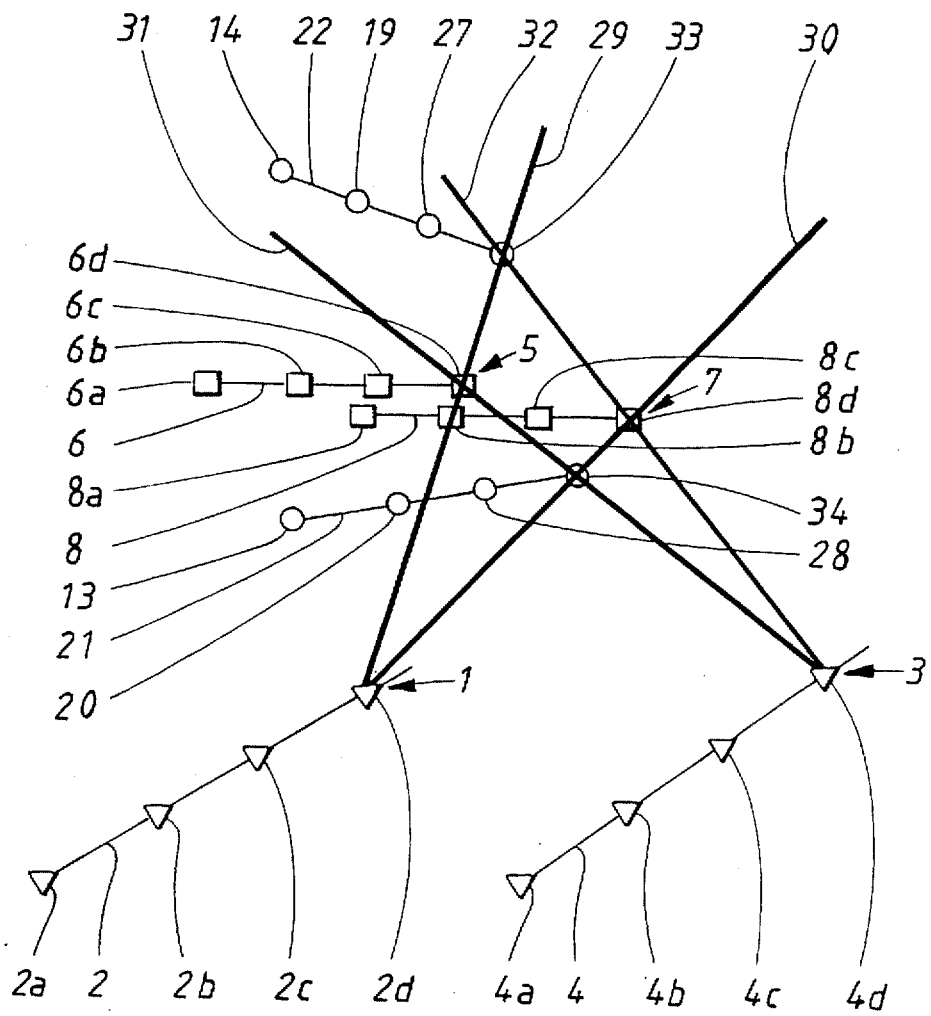

In FIG. 1, further positions 2b, 2c, 2d, 4b, 4c, 4d, 6b, 6c, 6d and 8b, 8c, 8d are indicated on the paths 2, 4, 6 and 8. The letters used in the position labels indicate related positions: 2c, 4c, 6c and 8c thus indicate the positions of the respective measuring stations 1, 3 and the measured objects 6 and 8 in a certain situation (the positions c). In FIGS. 2 to 4, the conditions for the three positions b, c and d are shown in more detail.

FIG. 2 thus shows the situation for the positions b. The measuring stations 1 and 3 are situated at the positions 2b and 4b, respectively, and the measured objects 5 and 7 are situated at the positions 6b and 8b, respectively. From the positions 2b and 4b, the directions 15, 16 and 17, 18, respectively, to the measured objects 5 and 7 are determined. The directions give rise to the two further crosses 19 and 20. The false crosses 13 and 14 have thus been moved along the paths 21 and 22, respectively, to the positions (crosses) 19 and 20.

In a corresponding manner, FIG. 3 shows the situation for the positions c, and FIG. 4 shows the situation for the positions d. The false crosses have moved along the paths 21 and 22 from 13 and 14 to 34 and 33, respectively. In principle, these paths do not differ from the paths 6 and 8 of the genuine measured objects, and it is therefore still impossible to distinguish, from the measuring stations, between genuine and false crosses.

Figure 5:
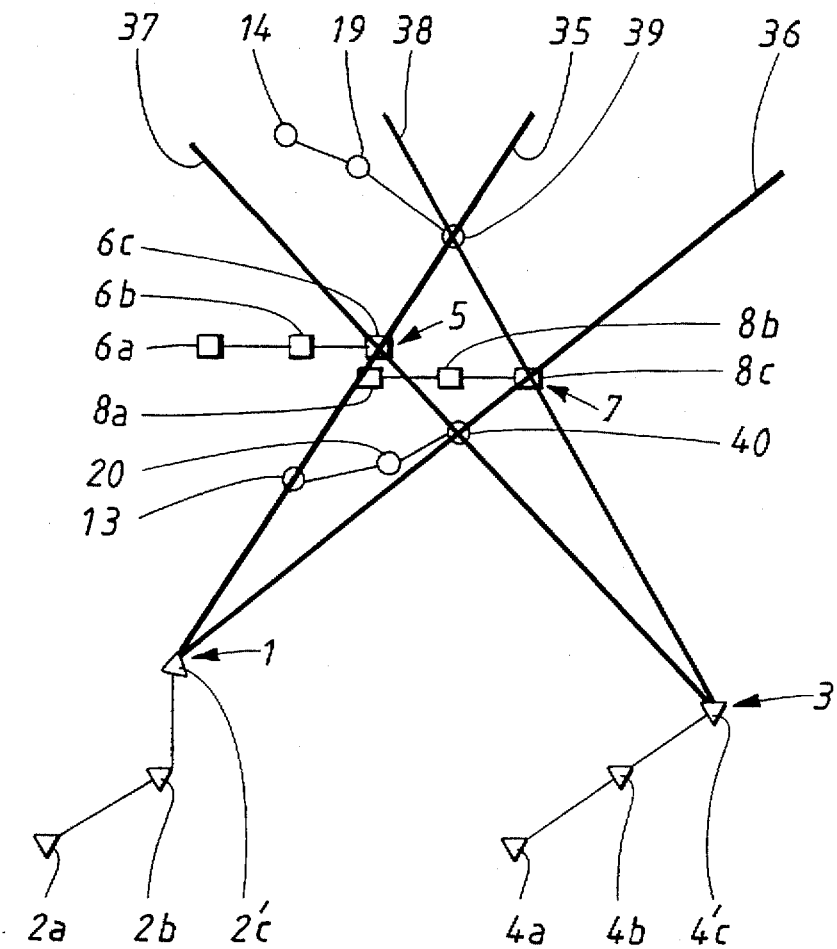
FIGS. 5-6 show corresponding measurement situations in one application of the invention.

According to the invention, this problem is solved by one or both of the measuring stations executing a manoeuvre. In FIG. 5, which corresponds to the situation for the positions c, the measuring station 1 has manoeuvred so that it is situated at the position 2'c when the measured objects are situated at the positions 6c and 8c. The measuring station 3 is at the same time situated at the position 4'c. From the positions 2'c and 4'c, the directions 35, 36 and 37, 38, respectively, to the measured objects 5 and 7 are measured. In the same way as before, false crosses are formed at 39 and 40.

Figure 6:
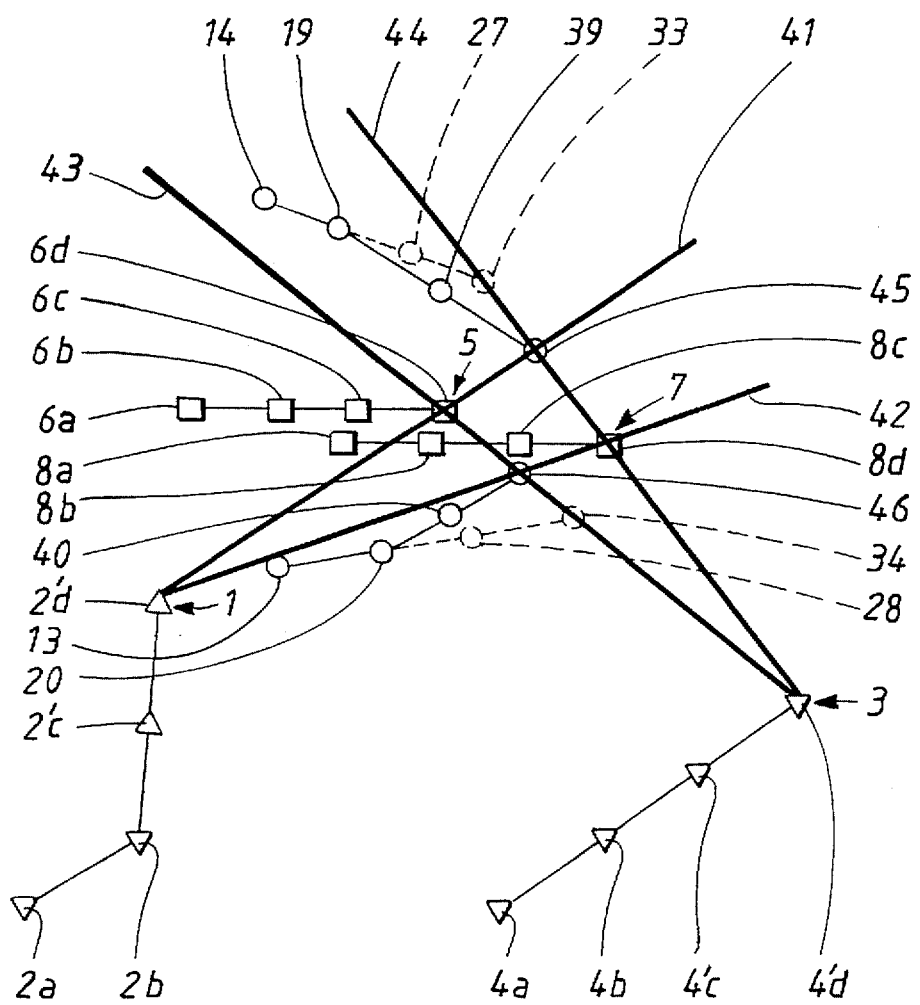

FIG. 6 corresponds to the situation for the positions d (FIG. 4). The measuring stations 1 and 3 are now situated at the positions 2'd and 4'd, respectively, and measure the directions 41, 42, and 43, 44, respectively, to the measured objects 5 and 7, which are situated at the positions 6d and 8d, respectively. The false crosses are formed at the positions 45 and 46.

In this case the false crosses have moved along paths through the positions 14, 19, 39, 45 and 13, 20, 40, 46, respectively. If these paths are compared with corresponding paths when the measuring station 1 does not manoeuvre (14-19-27-33 and 13-20-28-34, respectively, shown by broken lines in FIG. 6), it will be seen that the false crosses "execute" manoeuvres which correspond to the manoeuvre of the measuring station 1. By correlating, in the manner already described, the measuring station's manoeuvre with the movement of the crosses, it is thus possible to determine which crosses are genuine and which are false.

For the sake of simplicity, only one of the measuring stations has been manoeuvred in the example which has been described. It is thus sufficient for only one of the measuring stations to manoeuvre. By letting both manoeuvre, the manoeuvring effect on the false crosses can be intensified. It should be noted, however, that in certain geometrical configurations between measured objects and measuring stations, inappropriate manoeuvring can mean that the effect on the false crosses is weakened. To obtain the best results, it is therefore important that the manoeuvring takes place with account being taken of the actual situation.

Figure 7:
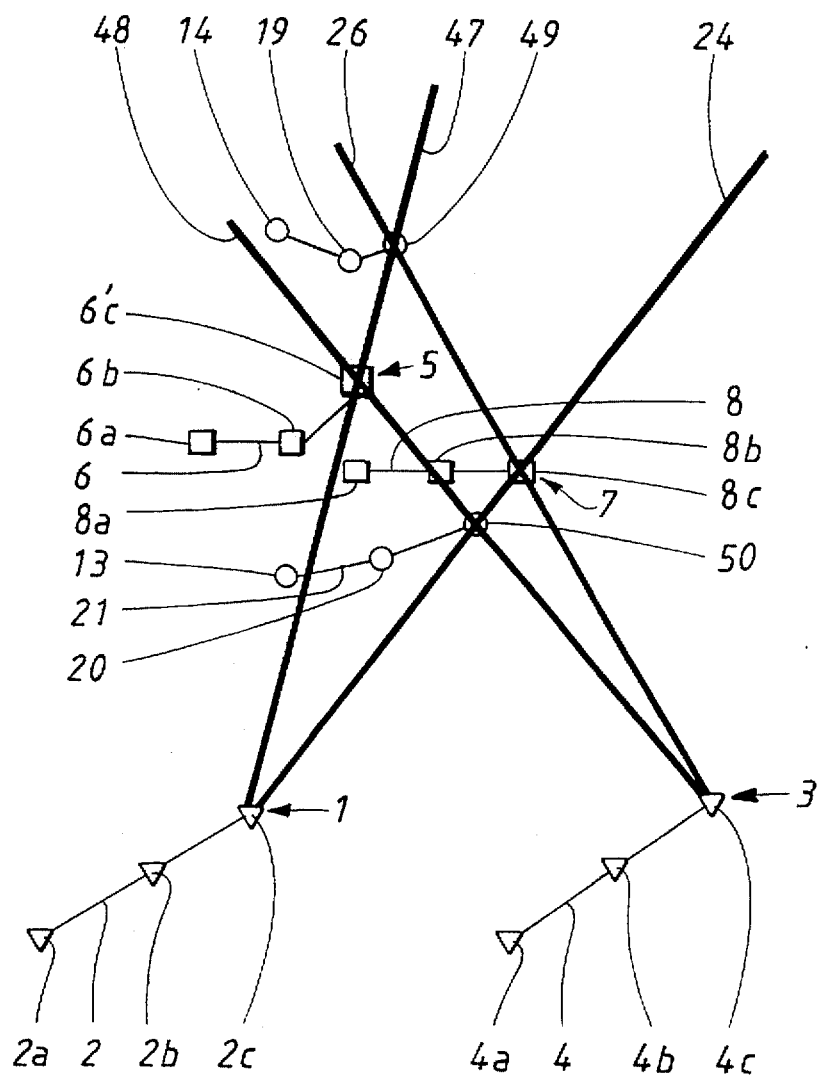
FIGS. 7-8 show corresponding measurement situations in another application of the invention.
Figure 8:
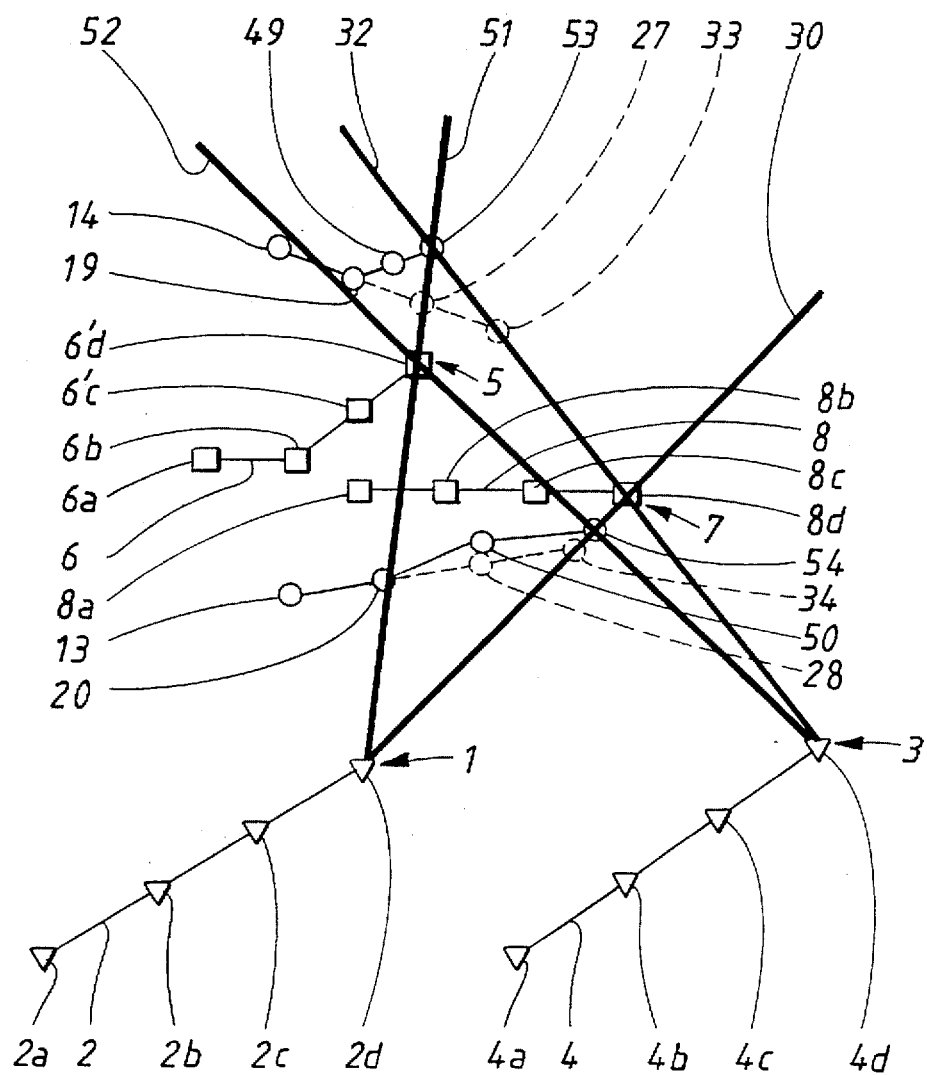

It has been shown, by way of this example, that it is possible, by altering the movement of a measuring station relative to the measured objects, to bring about a corresponding movement of the false measured objects. Such a manoeuvring of a measuring station is, however, unnecessary if one of the genuine measured objects manoeuvres and in this way changes its movement relative to the measuring stations. This case will be described in more detail hereinafter with reference to FIGS. 7 and 8. These figures correspond to the measurement situations which are illustrated by FIG. 3 and FIG. 4, respectively, the difference being that the genuine measured object 5 manoeuvres, as a result of which its path 6 acquires a different appearance. In FIGS. 7 and 8, the positions and directions etc. which correspond entirely with those indicated in FIG. 3 and FIG. 4, respectively, have been given the same reference numbers.

FIG. 7 thus differs from FIG. 3 in that the measured object 5 is situated at the position 6'c instead of at the position 6c. This means that the directions which are measured from the positions 2c and 4c and which pass through the position 6'c (47 and 48) are affected. Otherwise, the directions measured correspond with the equivalent ones in FIG. 3. The new directions 47 and 48 mean that the positions of the false measured objects, which are affected by any one of these directions, will also be changed. The false measured objects will therefore be found at the positions 49 and 50.

FIG. 8 shows the measurement situation which was described with reference to FIG. 4, the difference being that the measured object 5 is now situated at the position 6'd instead of at the position 6d. The directions measured from the measuring station positions 2d and 4d through the position 6'd are designated 51 and 52, respectively, and they create, at intersections with the unaffected directions 30 and 32, false crosses at the positions 53 and 54.

Because the genuine measured object 5 has changed its movement (manoeuvred), the false crosses will also move along the paths 14-19-49-53 and 13-20-50-54, respectively, instead of 14-19-27-33 and 13-20-28-34, respectively, which correspond to the paths of the false crosses if the measured object 5 had not manoeuvred. When a genuine measured object manoeuvres, those false crosses dependent on any one of the directions determined by the manoeuvring measured object will thus perform a corresponding manoeuvre. Conversely, by determining the directions to crosses which exhibit correlating manoeuvres, it is possible to decide which cross corresponds to a genuine measured object. This is possible by determining those crosses which are the point of intersection between directions which are each determined by at least two "manoeuvring" and correlating crosses.

The fact that a manoeuvring measured object also affects certain false crosses can be exploited in the case where a measuring station simultaneously manoeuvres. The changes in movement of the false crosses, occasioned by the manoeuvring measured object, can in fact be used for correcting the movement of the crosses so that the change in movement occasioned by the measuring station appears more prominently.

By means of the invention, it is thus possible, in passive position determination, to distinguish between genuine and false crosses by observing the changes in the movement of the crosses, originating from the movement either of a genuine measured object or of a measuring station.

The examples describe cases where both the measuring stations are mobile, but for a skilled person there will be no problem in applying the invention in a corresponding manner to a case where one of the measuring stations is stationary.

In addition, two measuring stations and two measured objects have been used in the examples. There is nothing, however, to prevent the method being applied with a larger number of measuring stations and measured objects.

Figure 9:
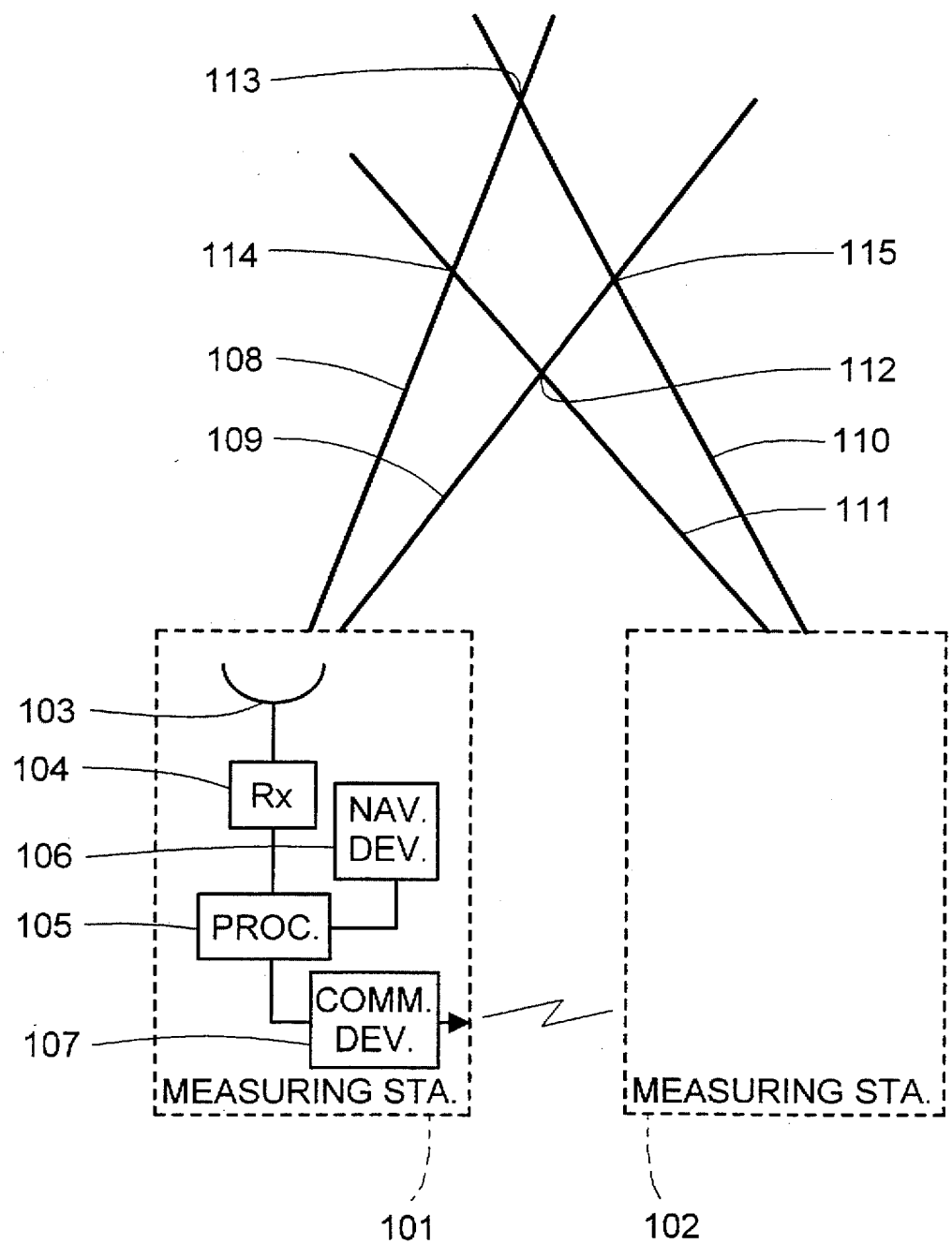
FIG. 9 shows an illustrative embodiment according to the invention.

FIG. 9 shows an application in which the described method is used by two measuring stations 101 and 102, which correspond for example to measuring stations 1 and 3, respectively, in FIGS. 1 to 8. Each measuring station is formed by a radar station consisting of an antenna 103 and a radar receiver 104 which is connected to the antenna and which is also connected to a processor 105. A navigation device 106 and a communications device 107 are also connected to the processor. The radar stations normally also include, among other things, a radar transmitter, but since this is not used for the invention, it is not shown in the figure.

In the directions 108, 109 and 110, 111, the radar receivers and the antennas in the measuring stations 101 and 102, respectively, are used to indicate measured objects which emit "radar signals". By using the method which has been described earlier, it is now possible to determine at which of the points of intersection 112–115 the measured objects are situated.

The direction information from the radar receivers is transferred to the processor of the respective measuring station. Information concerning the position of the measuring station and its changes in position are also transferred to this processor from the navigation equipment. In addition, the processor in each measuring station receives, via the communications equipment, corresponding information concerning the measurement result and position of the other measuring station. The processors of the measuring stations in this case have all the necessary data for tracking, with the aid of tracking filters, the movements of each "cross". Since the processor knows the movements of the measuring stations via the navigation devices, these movements can be correlated with the movements of the crosses, as a result of which it is possible, as has already been shown, to decide which crosses originate from measured objects.

The processor can also be designed in such a way that it determines, on the basis of the positions and movements of the crosses, how the measuring stations should act for their movements to affect the movements of the false crosses in an optimal manner.

Figure 10:
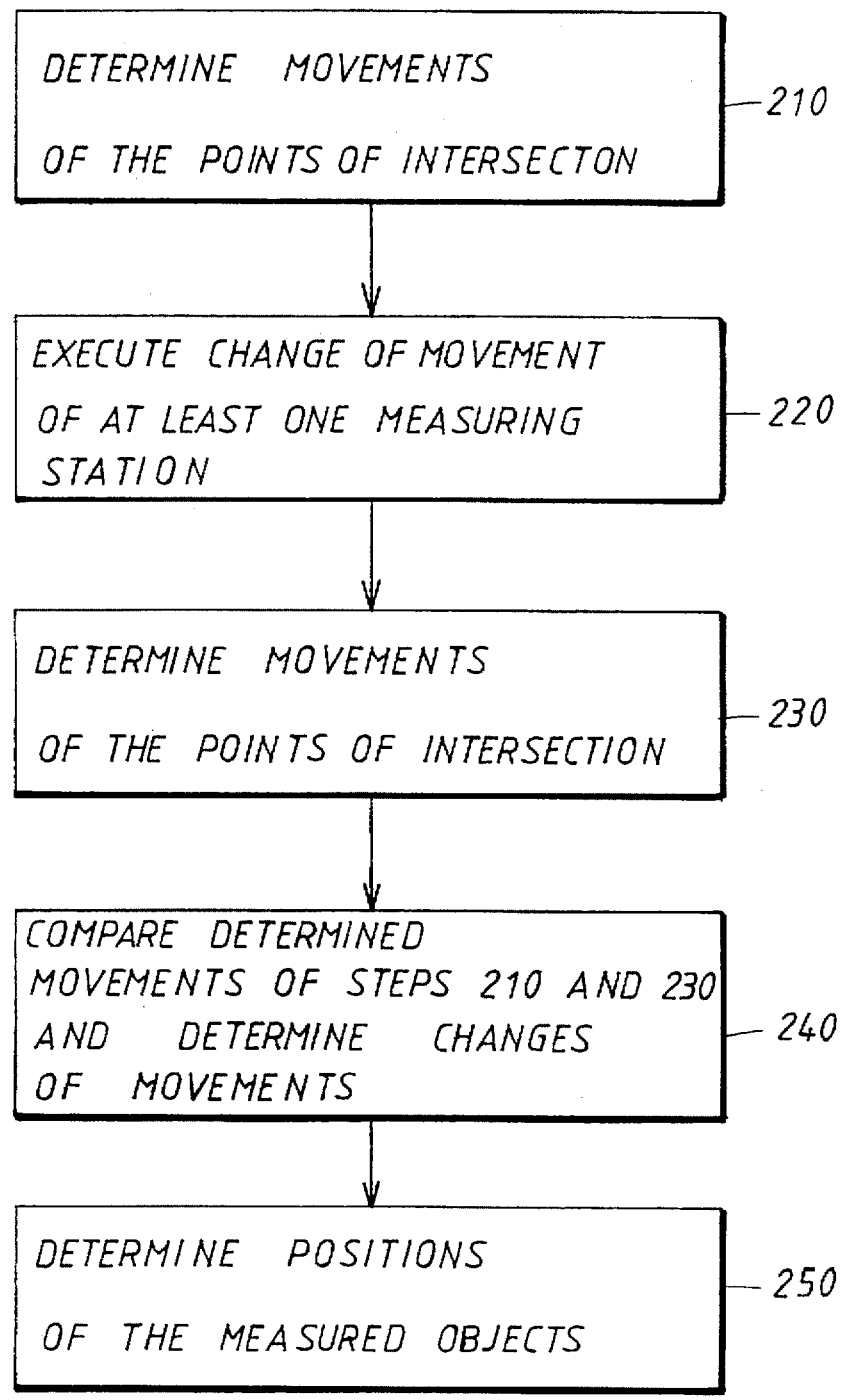
FIG. 10 shows a flow diagram of a method according to the invention.

FIG. 10 shows a flow diagram of a method according to the invention for determining the position of a number of measured objects. The method involves repeatedly determining a number of directions to the measured objects. The directions to the measured objects are determined by at least two measuring stations, of which at least one of the measuring stations is mobile, the details of which have been described previously. In a first step 210 the movements of points of intersection formed by the determined directions to the measured objects are determined. After the movements of the points of intersection have been determined, at least one of the measuring stations executes a change in movement in relation to the movement of the points of intersection in a second step 220. After at least one of the measuring stations has executed a change in movement in the second step 220, in a third step 230, the movements of the points of intersection formed by the determined directions to the measured objects are determined. In a fourth step 240 the movements of the points of intersection determined in the first step 210 and the third step 230 are compared and changes of relative movements between the measuring stations and the points of intersection are determined. Finally in a fifth step 250 it is determined which points of intersection correspond to measured objects and which points of intersection do not correspond to measured objects. Points of intersection whose movements are not influenced by the changes in the movement of the at least one mobile measuring station correspond to positions of the measured objects.

The invention is not limited to the embodiments mentioned above, but can be varied within the scope of the patent claims which follow.

What is claimed is:

1. Method for determining positions of a number of measured objects by determining a number of directions to the measured objects from at least two measuring stations, at least one of the measuring stations being mobile, the method being used to decide which of points of intersection formed between the directions correspond to measured objects and which points of intersection do not correspond to measured objects, the method comprising the steps of:

determining movements of the points of intersection by means of the determined directions to the measured objects, in connection with a determination of the directions to the measured objects, executing a change in the movement of the at least one mobile measuring station in relation to the movement of the points of intersection, and determining a change of relative movements between the measuring stations and the points of intersection, wherein points of intersection whose movements are not influenced by the change in the movement of the at least one mobile measuring station correspond to positions of the measured objects.

2. Method according to claim 1, wherein in a certain direction, the points of intersection which change their movement in the same direction as the mobile measuring station do not correspond to positions of measured objects if the points of intersection are situated between the measuring station and that point of intersection which corresponds to the position of a measured object.

3. Method according to claim 1, wherein in a certain direction, the points of intersection which change their movement in a direction opposite to the direction in which the mobile measuring station changes its movement do not correspond to positions of measured objects if the points of intersection are situated farther away from the measuring station than that point of intersection which corresponds to the position of a measured object.

4. Method according to claim 2, wherein during the determination of the points of intersection, earlier determined movements are used for predicting the movements of the points of intersection whereby a difference between the predicted movements of the points of intersection and the movements of the points of intersection determined by means of direction determination, is formed and used for improving the predicted movements.

5. Method according to claim 1, wherein the directions to the measured objects are determined passively.

6. Method according to claim 1, wherein the determination of directions to the measured objects are not time-synchronous.

7. Method according to claim 3, wherein during the determination of the points of intersection, earlier determined movements are used for predicting the movements of the points of intersection whereby a difference between the predicted movements of the points of intersection and the movements of the points of intersection determined by means of direction determination is formed and used for improving the predicted movements.

* * * * *